(No Model.)

G. W. KING.
PNEUMATIC RAILWAY SYSTEM.

No. 438,928. Patented Oct. 21, 1890.

WITNESSES:
Fred G. Dietrich
Jos. A. Ryan

INVENTOR:
George W. King.
BY
ATTORNEYS

UNITED STATES PATENT OFFICE.

GEORGE W. KING, OF WASHINGTON, DISTRICT OF COLUMBIA.

PNEUMATIC-RAILWAY SYSTEM.

SPECIFICATION forming part of Letters Patent No. 438,928, dated October 21, 1890.

Application filed July 24, 1890. Serial No. 359,835. (No model.)

*To all whom it may concern:*

Be it known that I, GEORGE W. KING, residing at Washington, in the District of Columbia, have invented certain new and useful Improvements in Pneumatic-Railway Systems, of which the following is a specification.

My invention has for its object to provide a simple and effective connection between the air-tube and the motor on the car-body, whereby a continuous flow of air from the tube to the said motor will be maintained.

It has also for its object to render the operation of said connection positive without undue friction and yet maintain air-tight joints between said connection and the tube to prevent the escape of air from said tube.

To this end my invention consists in the peculiar combination and novel arrangement of parts, all of which will hereinafter be fully described in the annexed specification, and be particularly pointed out in the claims, reference being had to the accompanying drawings, in which—

Figure 1:
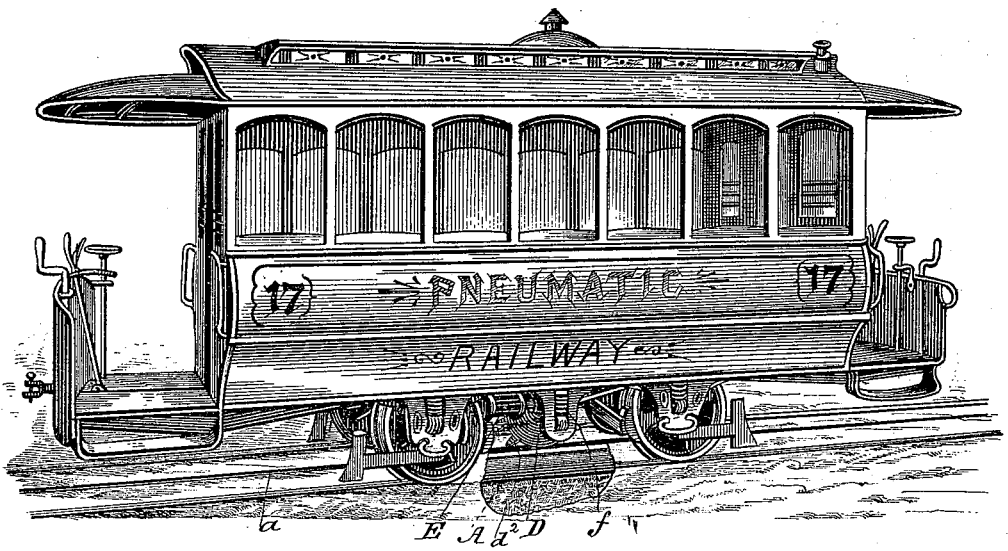
Figures 2, 4:
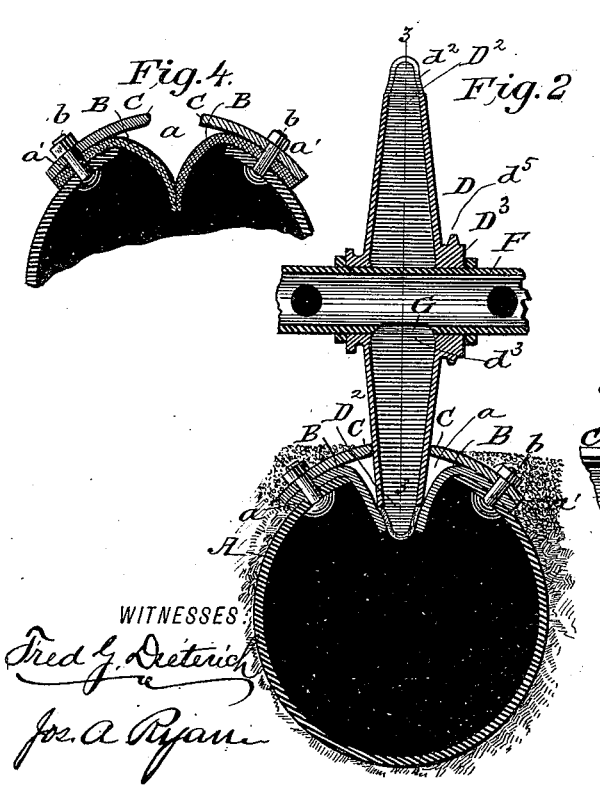
Figure 3:
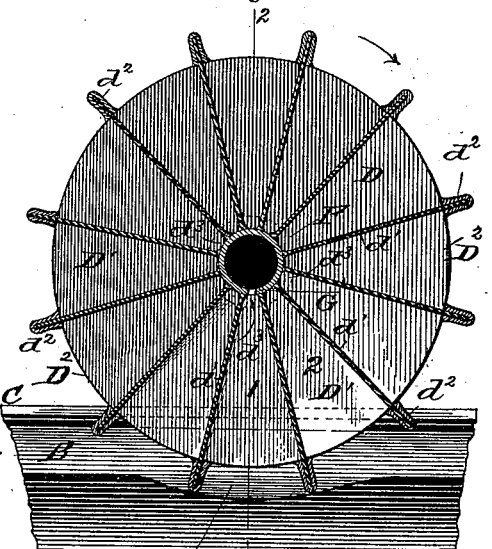

Figure 1 is a perspective view of a street-car with my improvements applied. Fig. 2 is a vertical section of the air-tube or conduit and the revolving air-conveyer, taken on the line 2 2, Fig. 3. Fig. 3 is a view of the same, taken on the line 3 3, Fig. 2. Fig. 4 is a detail cross-section of the air-conduit, showing the flap-valves in a closed position.

In the accompanying drawings, A indicates the compressed-air tube or conduit, which is buried along the track midway of the rails, its upper end, which is formed with a continuous slot $a$, being arranged flush with the street surface, as shown.

B B denote flap-valves riveted upon the adjacent upper edges of the tube, as at $a'$, by means of the bolts $b\ b$, which also serve to secure over the edges of said flap-valves the slot irons or guides C C, said flap-valves being formed in any suitable manner so as to present continuous cut-off valves the entire length of the slot $a$. By reference to Fig. 4 of the drawings it will be observed that the valves B B extend inward and downward into the conduit, the lower ends thereof pressing against each other, thereby cutting off any escape of air from the conduit. By arranging the valves as shown the air-pressure in the tube A will press sidewise against the valves, thus avoiding any danger of the internal air-pressure forcing said valves up through the slot, and at the same time forming a complete air-tight joint between said flap-valves.

D indicates the air-conveyer, which leads the air from the tube A to the motor mechanism E on the car, said conveyer consisting of a hollow body of elliptical shape in cross-section, journaled upon a transverse hollow spindle F, mounted on the car-body in vertically-yielding bearings $f$.

The conveyer D is formed with a series of radial compartments D', the partition-walls $d'$ of which extend beyond the periphery thereof and form radial blades $d^2\ d^2$, whereby the compartments D' are formed with open ends $D^2$, as shown. By reference to Figs. 2 and 3 of the drawings it will be seen that by forming the conveyer of the shape shown the radial compartments are formed with contracted outlets $d^3$ in the direction of the length of the wheel, as seen in Fig. 3, but expanded transversely, as shown in Fig. 2, said compartments being formed with enlarged openings longitudinally and contracted openings transversely at their lower ends, as shown. By this arrangement I am enabled to equalize the air area in the said compartments, and thus lead the air from the inlet $d'$ into an inlet-port G, located on the lower face of the spindle F under the same pressure. It will also be seen by reference to Fig. 3 of the drawings the relation of the discharge ends of the several compartments in the conveyer and the port G in the spindle F is such that it (the port G) will be in communication with the lowermost compartment only, as the said opening is temporarily closed by the slightly-enlarged ends of the radial partition-walls $d'$, as one radial compartment passes rearward and the next compartment comes to its lowermost position. Thus should the wheel be turned in the direction indicated by the arrow in Fig. 3 the pocket or compartment 2 will be in engagement with the port G immediately after the pocket 1 has been shut off. The radial blades, which in practice are lowered into the slot $a$, have their edges covered with a suitable yielding substance—such as rubber—so as to form a tight connection between the valves B when they are pressed apart at a point between the lowermost two, whereby an opening H is formed, through which the air escapes into the conveyer. I desire to state, however, that the relation of the radial blades to the flap-valves B is such that as a pair of such blades are in their lowermost postion and in open communication with the tube A the first blade rearward and the first blade forward of said pair of blades are also within the upper meeting edges of the valves B, said radial blades having tapered ends, as shown in Fig. 2, thereby allowing the flap-valves to press tightly against them so long as any portion thereof is between them. It will thus be seen that the radial blades adjacent to the lower pair of radial blades serve to close off any escape of air from the tube A (which might possibly get into the adjacent compartments) out between the flap-valves. While I have shown the conveyer formed with twelve radial compartments, it is manifest that a greater or less number may be employed, it depending upon the diameter of the conveyer-wheel. In practice, however, a large number of such compartments would be desirable, as the smaller the mouth H of each compartment the more effectually will the flap-valves serve to close off escape of air from the tube.

The conveyer-wheel D is formed with a hub $D^3$, upon which is formed a sprocket wheel or pulley $d^5$, which is chained to either of the axles of the car. Thus when the car is started the wheel D will be caused to turn on the spindle F, its blades successively entering between the flap-valves and opening a continued air-passage from tube A to the motor, and as the said wheel revolves the blades will in their upward movement be pulled forward, thus lifting them out from between the said valves in the direction of the moving car, and thereby avoiding any unnecessary friction on the valves.

Any suitable means may be provided for connecting the spindle F with the car-motor; but I prefer to use flexible hose-connections, so as to admit of the wheel D being raised vertically, whereby the same may be drawn up out of the slot $a$, so as to disconnect the conveyer from the tube when the car, in going downgrade, jumps the track or becomes otherwise disabled.

From the foregoing description, taken in connection with the drawings, the advantages of my improvements will readily appear. It will be observed that the same is exceedingly simple in construction, it being capable of ready disconnection from the conduit in case of an emergency. It will also be seen that the momentum of the car will cause the air-conveyer to turn and force the valves apart, thus overcoming the resistance of such valves. Furthermore, by my arrangement of the conveyer the friction is greatly reduced, as the conveyer-wheel in its revolution has also a sliding forward motion, which gently opens the valves.

Having thus described my invention, what I claim, and desire to secure by Letters Patent, is—

1. In a pneumatic-railway system, the combination, with the air-tube A, having a continuous slot $a$, valves normally closing said slot by the air-pressure in said tube, and a motor on the car-body, of a revolving air-conveyer held to rotate on the car-body, formed with radial blades adapted to project between the valves in the conduit, said conveyer formed with inlet-ports, and an air-connection between said conveyer and the car-motor, substantially as and for the purpose described.

2. In a pneumatic-railway system, the combination, with the conduit A, formed with a slot $a$, valves adapted to normally close said slot, and a motor on the car, of a hollow spindle mounted on the car, formed with inlet and outlet ports adapted to be connected with the motor, and a hollow circular conveyer held to rotate on said spindle, formed with a series of radial compartments and a series of radially-projecting blades, whereby a series of inlet-ports are formed between said blades adapted to be successively brought into communication with said tube, said conveyer-compartments adapted to successively communicate with the inlet in the spindle, substantially as and for the purpose described.

3. In a pneumatic-railway system, the combination, with the air-tube A, formed with a slot $a$, flap-valves adapted to normally close said slot, and a motor mounted on the car-body, of an air-conveyer mounted on the car, adapted to connect the tube and motor, said conveyer consisting of a hollow spindle connected with the motor and formed with an air-inlet, a hollow circular body mounted to rotate thereon, formed with a series of radial compartments having contracted inner ends adapted to successively communicate with the spindle-inlet and enlarged peripheral openings, radial blades projected from the said body to each end of said peripheral opening, and means for revolving said hollow conveyer, substantially as and for the purpose described.

GEO. W. KING.

Witnesses:
FRED G. DIETERICH,
SOLON C. KEMON.